United States Patent [19]
Reimann et al.

[11] Patent Number: 6,101,839
[45] Date of Patent: Aug. 15, 2000

[54] COMPACT ABSORPTION MACHINE

[75] Inventors: Robert C. Reimann, LaFayette; Alejandro R. Garcia, Manlius, both of N.Y.

[73] Assignee: Carrier Corporation, Farmington, Conn.

[21] Appl. No.: 09/237,491

[22] Filed: Jan. 25, 1999

[51] Int. Cl.[7] .................................................. F25B 15/00
[52] U.S. Cl. ................................................. 62/476; 62/475
[58] Field of Search ........................... 62/489, 298, 476, 62/485, 487, 475

[56] References Cited

U.S. PATENT DOCUMENTS

| | | | |
|---|---|---|---|
| 3,864,930 | 2/1975 | Hopkins | 62/476 |
| 4,348,868 | 9/1982 | Foster et al. | 62/141 X |
| 5,016,448 | 5/1991 | Plzak | 62/476 |
| 5,592,825 | 1/1997 | Inoue | 62/476 X |
| 5,636,526 | 6/1997 | Plzak et al. | 62/476 X |
| 5,643,544 | 7/1997 | Henkelmann | 423/245.3 |
| 5,752,388 | 5/1998 | Hoshino et al. | 62/141 |
| 5,813,241 | 9/1998 | Sibik et al. | 62/141 X |

FOREIGN PATENT DOCUMENTS 62-178858  2/1986  Japan.

*Primary Examiner*—William Doerrler
*Assistant Examiner*—Chen-Wen Jiang
*Attorney, Agent, or Firm*—Wall Marjama Bilinski & Burr

[57] ABSTRACT

An absorption air conditioning machine that includes a main machine section containing an evaporator unit, an absorber unit, at least one generator unit, a condenser unit, and at least one solution heat exchanger. The heat exchanger tubes of the units and the solution heat exchanger are all supported within a pair of spaced apart tube sheets to provide a highly compact machine assembly.

8 Claims, 3 Drawing Sheets

COMPACT ABSORPTION MACHINE

BACKGROUND OF THE INVENTION

This invention relates to absorption air conditioning, and, in particular, to a compact air conditioning machine.

As is well known in the art, multi-stage absorption air conditioning machines for providing both heating and cooling contain a relatively large number of tubular components that are interconnected by flow circuits for moving working fluids between the components to complete the absorption cycle. One such machine is available through Carrier Corp. of Syracuse, N.Y., under the 16DF designation. The 16DF utilizes water as a refrigerant and lithium bromide as an absorbent. A weak solution of water and lithium bromide is developed in the system absorber which contains a high concentration of water. The weak solution is passed through a series of generators where the refrigerant is heated under a relatively low pressure and vaporized. Strong solution from the generators, which is at a relatively high temperature, is brought through solution heat exchangers in heat transfer relationship with the weak solution moving into the generators.

Heretofore, the solution heat exchangers were independent units, each being fully contained within its own housing. The heat exchanger tubes are mounted between relatively thin tube sheets and, as a consequence, a tube failure generally resulted in the replacement of the entire heat exchanger. This, of course, results in considerable machine down time and expense. In addition, housing the solution heat exchangers independently requires a good deal of space.

SUMMARY OF THE INVENTION

An object of this invention is to improve absorption air conditioning systems.

A further object of the present invention is to reduce the size of absorption air conditioning systems and, in particular, multiple stage absorption air conditioning systems.

A still further object of the present invention is to reduce the number of steps required to manufacture and assemble an absorption air conditioning system.

Another object of the present invention is to integrate the solution heat exchangers of a multiple stage absorption machine into the main section of the machine to better conserve space and to simplify maintenance of these heat exchangers.

These and other objects of the present invention are attained in an absorption machine which contains a pair of opposed tube sheets having axially aligned holes for receiving the tubes of an evaporator, an absorber, at least one generator and a condenser that are interconnected to complete an absorption cycle for providing either heating or cooling. In addition, the tube sheets contain axially aligned holes for supporting one or more solution heat exchangers generally equal in number to the number of generators utilized in the system. The shells surrounding the various units supported between the tube sheets are welded to the sheets to create a leak tight, highly compact, assembly.

BRIEF DESCRIPTION OF THE DRAWING

For a better understanding of the nature and objects of the invention, reference should be made to the following detailed description of the invention, which is to be read in connection with the accompanying drawings, wherein.

DETAILED DESCRIPTION OF THE INVENTION

Figure 1:
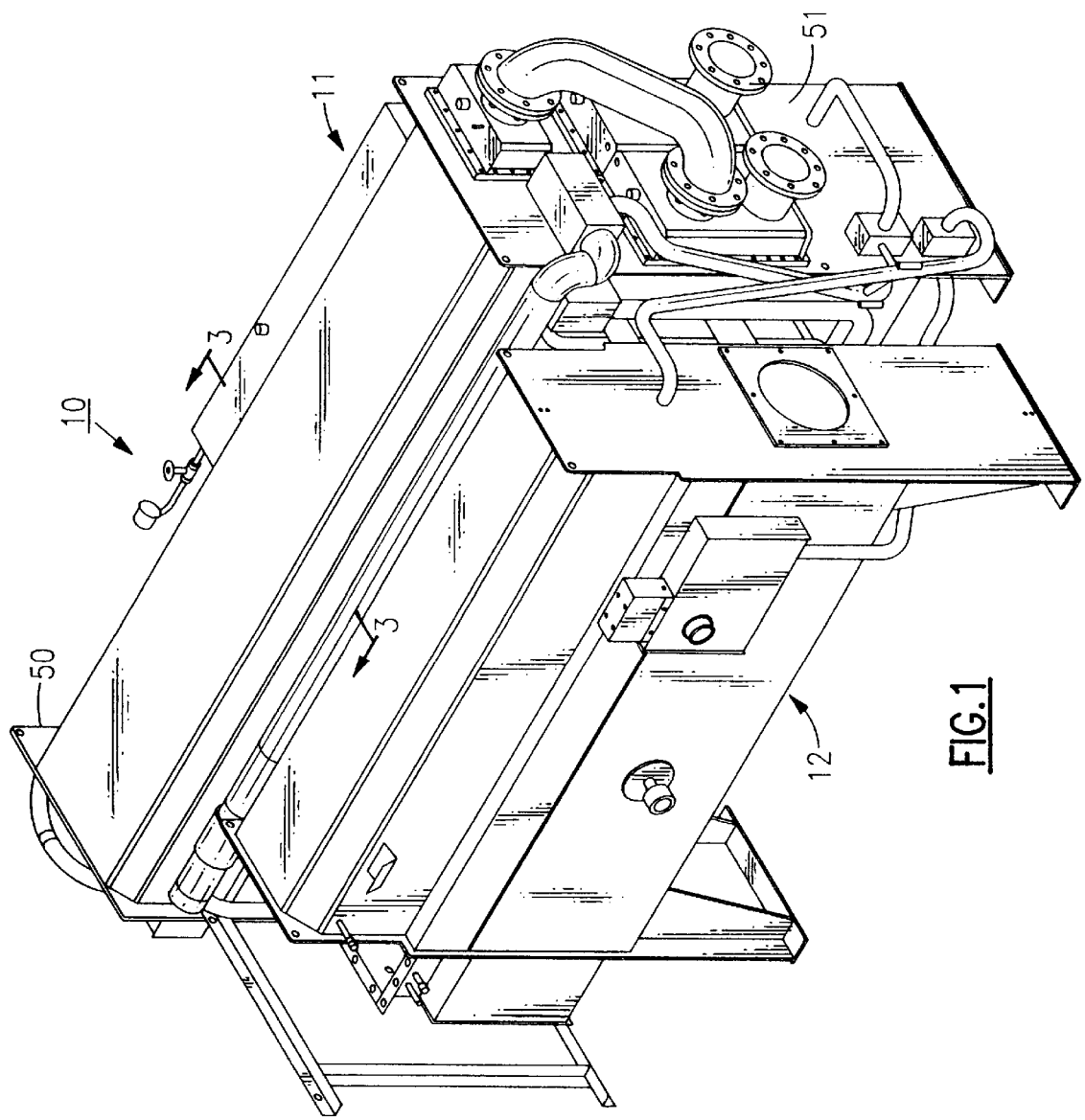
FIG. 1 is a perspective view of a multiple stage absorption machine embodying the teachings of the present invention.

Referring initially to FIG. 1, there is illustrated a multiple stage absorption air conditioning machine that is generally referenced 10. As noted above, the general configuration of the machine is well-known and embodies a two-stage machine marketed by Carrier Corporation of Syracuse, N.Y. The machine includes two sections which will be herein referred to as the main or first larger section 11, and a relatively smaller section 12 located adjacent to and in close proximity with the first larger sections. Although the present invention will be described with specific reference to a two stage machine, it is not restricted or otherwise limited to this particular configuration and, it will be applicable to use in association with either a single stage machine or one having multiple stages including split systems having independent circuits for processing different absorbent and refrigerant combinations. The various components are connected by flow tubes in a manner that is well known in the art and need not be described herein in detail.

Figure 2:
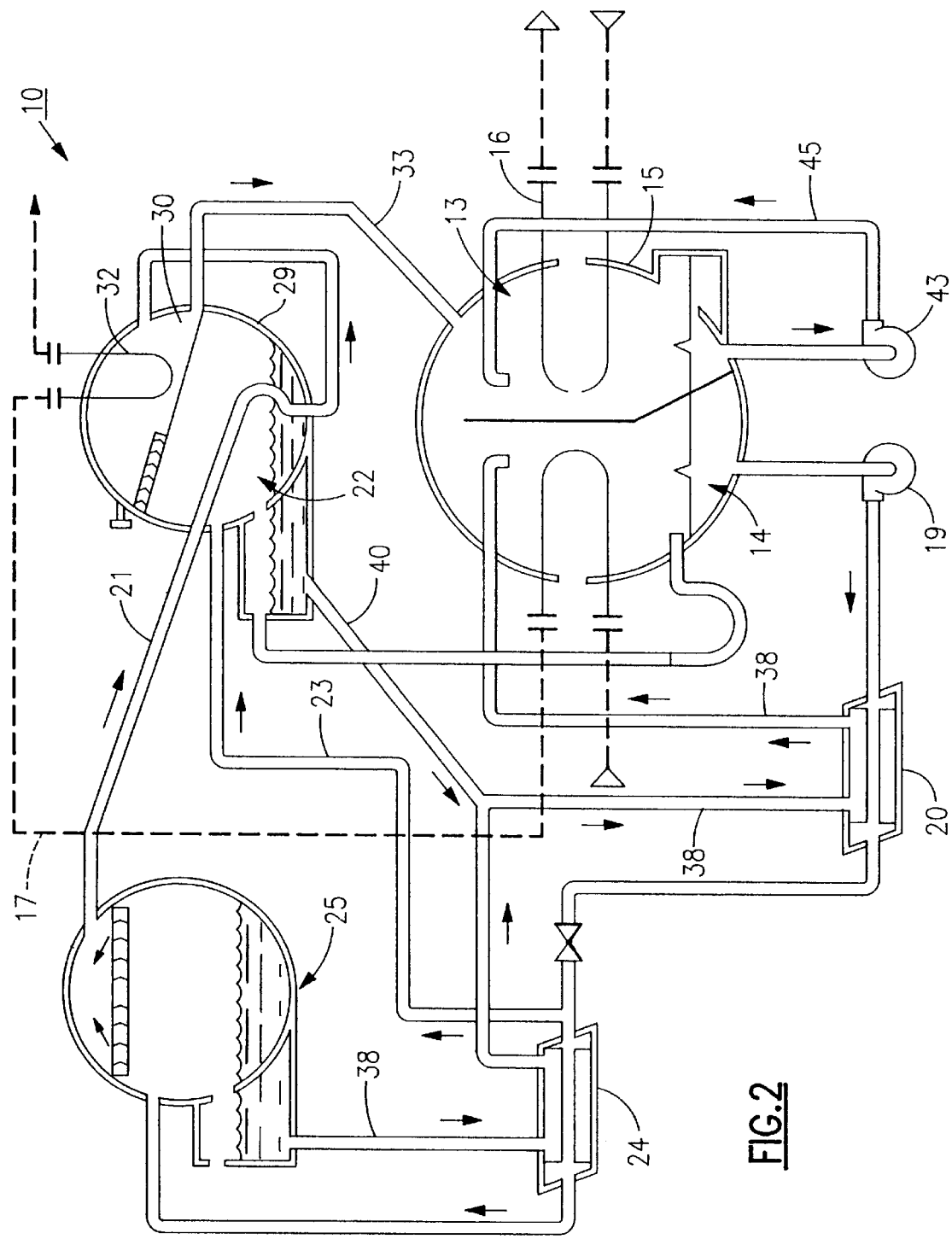
FIG. 2 is a schematic representation of the absorption machine shown in FIG. 1 illustrating the operative relationship of the machine components.

Turning now to FIG. 2, the two stage air conditioning system utilized in the machine illustrated in FIG. 1 will be explained in regard to a cooling cycle in sufficient detail so that one skilled in the art can better understand the present invention. As should be evident to one skilled in the art, the cooling cycle can be reversed to also provide heating. Although the present system employs water as a refrigerant and lithium bromide as an absorbent, any suitable combination can be utilized in the practice of the invention. Lithium bromide has a high affinity for water and will absorb water in relatively large amounts under the machine's normal operating conditions.

The machine includes an evaporator unit 13 and an absorber unit 14 that are combined within a single shell 15. Refrigerant used in the process is vaporized in the evaporator where it absorbs heat from a substance being chilled which is passed through the evaporator by line 16. Vaporized refrigerant from the evaporator is passed into the absorber where it is absorbed by lithium bromide. Cooling water is passed through the absorber by a cooling water line 17 which carries away heat energy generated during the absorption process.

The weak solution which is rich in refrigerant is drawn from the absorber by a solution pump 19 and is passed through a low temperature solution heat exchanger 20. As will become evident from the disclosure below, the weak solution is brought into a heat transfer relationship with higher temperature strong solution which has given up much of its refrigerant in the process to increase the temperature and thus the concentration of the weak solution.

Upon leaving the low temperature solution heat exchanger, about half of the weak solution is sent to the low temperature generator 22 via solution line 23. The remaining solution is sent through a high temperature solution heat exchanger 24 and passed into a high temperature generator 25. Although not shown, the solution in the high temperature generator is heated by a burner or the like to vaporize the refrigerant. The water vapor that is boiled away from the absorbent in the high temperature generator is passed via vapor line 21 into the low temperature generator unit 22 which is housed in a separate shell 29 in combination with the system condenser 30. Here, the remainder of the weak solution is heated by the high temperature refrigerant from the high temperature generator which boils away further refrigerant in the low temperature generator, delivering the resultant condensate to the system condenser 30.

Refrigerant vapor that is boiled away in the low temperature generator is also passed into the condenser section 30 of the shell and is condensed on tubes 32 that carry cooling water through this section. The cooling water in this case is the same cooling water that has previously been used in the absorber and which is delivered into the condenser by means of cooling water line 17. The condensed refrigerant is flowed back to the evaporator by refrigerant line 33 to complete the cycle. In transit, the refrigerant is throttled or expanded from the high pressure side of the system to the low pressure side of the system by suitable throttling means (not shown).

The strong absorbent solution flows from the two generators back to the absorber to be reused in a new refrigeration cycle. On the way back to the absorber the strong solution from the high temperature generator is passed through both the first and second solution heat exchangers by return line 38 to give up its energy to the weak solution as it moves into the generators. Strong solution leaving the low temperature generator is connected into the main return line 38 by feeder line 40.

A refrigerant pump 43 is arranged to circulate refrigerant collected in the sump of the evaporator through the spray head of the refrigerant return line 45 where it is sprayed, along with the refrigerant from the condenser, over the evaporator heat exchanger tubes.

Figure 3:
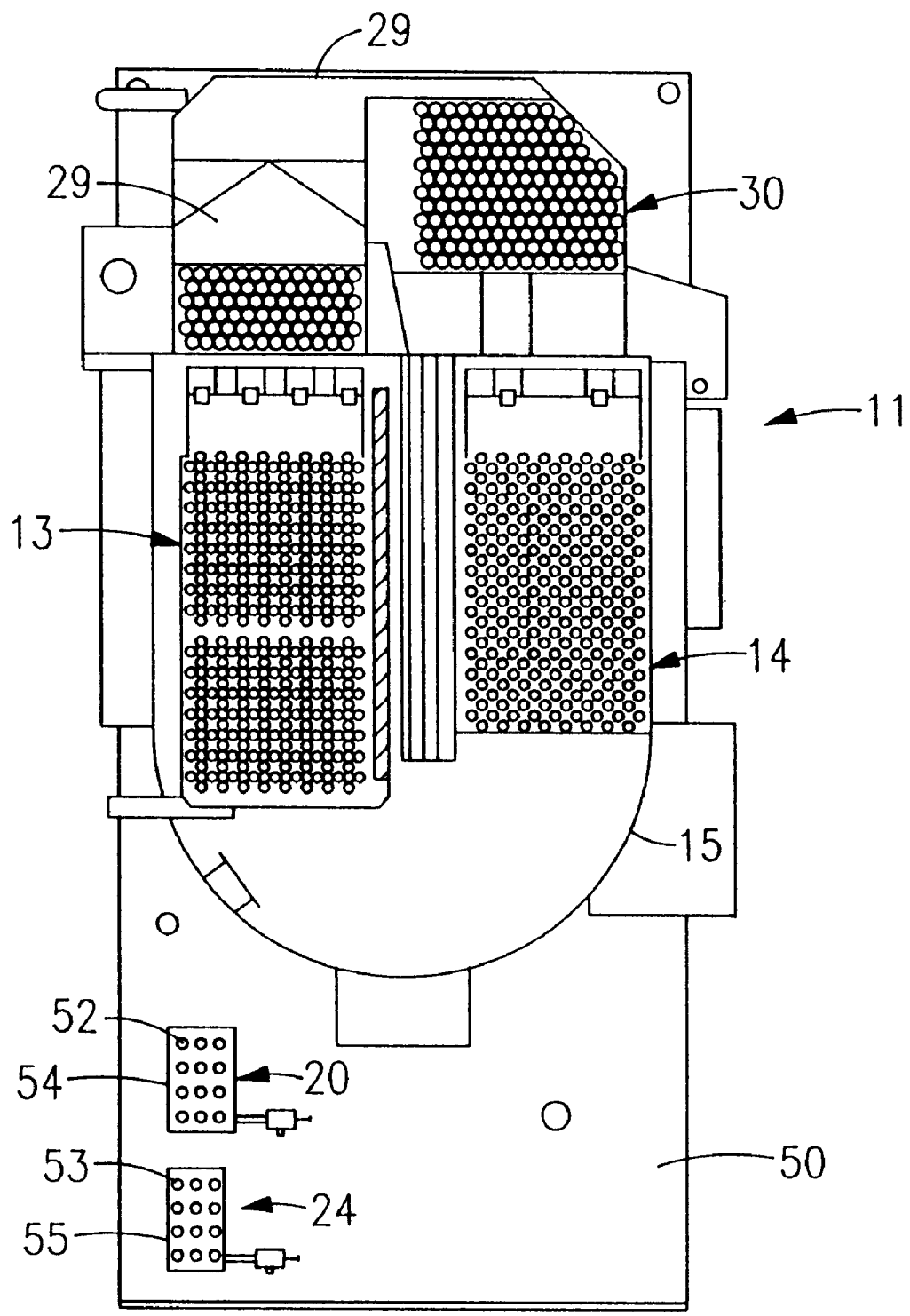
FIG. 3 is a sectional view taken along lines 3—3 in FIG. 1 further illustrating the main section of the machine.

The combination evaporator and absorber assembly, along with the low temperature generator and condenser assembly are contained in the larger section 11 of the machine while the high temperature generator and the burner for firing the high temperature generator are contained in the smaller section 12 of the machine. As illustrated in FIG. 3, the two solution heat exchangers 20 and 24 employed in the present machine are also both contained in the main larger machine section 11. The main machine section contains a pair of spaced apart tube sheets 50 and 51 that are part of the main support structure of the machine. Each tube sheet is machined so that tube holes for all of heat exchanger tubes of the above noted units are formed in axial alignment. Accordingly, the machining of the tube sheets can be performed in a single operation thus assuring accurate alignment of the tubes and minimal tooling and set up. This, in turn, enables the machine to be rapidly manufactured and assembled and minimizes the amount of space that is required.

The tube sheets provide adequate support for the tubes and the shells that house the various machine components. In assembly, each shell is welded to the tube sheets to provide a leak tight structure. The tube receiving holes can be similarly closed to render the interior of each shell leak tight.

The tube bundle 52 of the low temperature solution heat exchanger 20 is shown in FIG. 3 housed within a separate shell 54 while the tube bundle 53 of the high temperature heat exchanger 24 is shown house within its own shell 55. Under certain machine configurations, however, it may be advantageous to house both tube bundles within a single shell. Similarly, although the present embodiment involves a two stage absorption machine requiring two solution heat exchangers, systems employing more or less stages and thus more or less solution heat exchangers can be accommodated by apparatus of the present invention to furnish a truly compact space saving machine.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An absorption air conditioning apparatus that includes
   a main section containing an absorber unit, an evaporator unit, a first generator unit and a condenser unit, said units containing heat exchanger tubes that are operatively connected to form an absorption air condition system,
   flow means for exchanging an absorbent solution between the absorber unit and the first generator unit,
   at least one solution heat exchanger having heat exchanger tubes for transferring heat between weak solution being delivered from the absorber to said first generator and strong solution being returned from said first generator to the absorber, and
   a pair of opposed tube sheets mounted in said main section of the machine containing axially aligned holes formed therein for supporting therein heat exchanger tubes relating to said units and the heat exchanger tubes of said at least one solution heat exchanger.

2. The apparatus of claim 1 that further includes at least one additional higher temperature generator unit and a burner, located in a second section of the machine, said higher temperature generator being operatively connected into said air conditioning cycle to form a multiple stage absorption machine.

3. The apparatus of claim 2 that further includes a plurality of higher temperature generators and a plurality of solution heat exchangers equal in number to the number of generators, said solution heat exchangers being mounted in said main section with the tubes of said solution heat exchangers being supported in said tube sheets.

4. The apparatus of claim 3 wherein said absorber unit and said evaporator unit are combined within a first shell, said first generator unit and said condenser unit are combined within a second shell and said solution heat exchangers are contained within at least one shell.

5. The apparatus of claim 4 wherein each of said shells are mounted in leak tight relationship with said tube sheets.

6. An absorption air conditioning apparatus that includes
   a first section containing a pair of spaced apart tube sheets having axially aligned holes formed therein for supporting heat exchanger tubes of a combined evaporator and absorber unit, a generator, and condenser unit and at least one solution heat exchanger unit,
   said evaporator and absorber unit being contained within a first shell, said generator and condenser assembly being contained within a second shell and said at least one solution heat exchanger being contained in a third shell,
   said shells being mounted in a leak tight relationship with said tube sheets.

7. The apparatus of claim 6 that further includes a plurality of solution heat exchangers mounted between said tube sheets.

8. The apparatus of claim 7 wherein said plurality of solution heat exchangers are mounted in individual shells.

* * * * *